(12) United States Patent
Makwana et al.

(10) Patent No.: US 10,985,598 B2
(45) Date of Patent: Apr. 20, 2021

(54) EMERGENCY LIGHTING CONVERTER

(71) Applicant: TRIDONIC GMBH & CO KG, Dornbirn (AT)

(72) Inventors: Deepak Makwana, Tyne and Wear (GB); Jagjitpati Shukla, Durham (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/603,605

(22) PCT Filed: Apr. 27, 2018

(86) PCT No.: PCT/EP2018/060987
§ 371 (c)(1),
(2) Date: Oct. 8, 2019

(87) PCT Pub. No.: WO2018/215171
PCT Pub. Date: Nov. 29, 2018

(65) Prior Publication Data
US 2020/0076227 A1    Mar. 5, 2020

(30) Foreign Application Priority Data
May 22, 2017    (GB) .................................. 1708460.9

(51) Int. Cl.
*H02J 7/00* (2006.01)
*H02J 9/02* (2006.01)
(Continued)

(52) U.S. Cl.
CPC .................. *H02J 9/02* (2013.01); *H02J 7/00* (2013.01); *H02J 9/061* (2013.01); *H05B 45/37* (2020.01)

(58) Field of Classification Search
CPC ........ H02J 7/00; H02J 9/02; H02J 9/06; H02J 9/061; H05B 45/10; H05B 45/37; H05B 45/38
(Continued)

(56) References Cited

U.S. PATENT DOCUMENTS 6,502,044 B1    12/2002  Lane et al.
7,276,861 B1    10/2007  Shteynberg et al.
(Continued)

FOREIGN PATENT DOCUMENTS

EP      2 947 963    11/2015
GB      2535808      8/2016
WO      2013004061   1/2013

OTHER PUBLICATIONS

Design Consideration for Boundary Conduction Mode Power Factor Correction (PFC) Using FAN7930, YoungBae Park Fairchild Semiconductor Corporation. pp. 1-22 (Year: 2010).*
(Continued)

*Primary Examiner* — Toan T Vu
(74) *Attorney, Agent, or Firm* — Andrus Intellectual Property Law

(57) ABSTRACT

An emergency converter according to the invention is used in lighting applications for operation from an energy storage device in case of mains failure. The converter device comprises a charger circuit configured to charge the energy storage device and a microcontroller circuit configured to control the charger circuit. The driver circuit is preferably implemented in a coupled inductor boost circuit topology. The microcontroller circuit is further configured to control the switch based on a zero crossing of a measured inductor current.

8 Claims, 7 Drawing Sheets

(51) Int. Cl.
*H02J 9/06* (2006.01)
*H05B 45/37* (2020.01)

(58) Field of Classification Search
USPC .................. 307/20; 315/193, 224, 247, 308;
323/207; 363/44, 89
See application file for complete search history.

(56) References Cited

U.S. PATENT DOCUMENTS

| | | |
|---|---|---|
| 2013/0026926 A1 | 1/2013 | Oh et al. |
| 2013/0113390 A1 | 5/2013 | Oh et al. |
| 2014/0125247 A1* | 5/2014 | Mitterbacher .......... H02M 1/42 315/224 |
| 2015/0061530 A1 | 3/2015 | Kang |
| 2015/0061531 A1* | 3/2015 | Kang .................... G09G 3/342 315/224 |

OTHER PUBLICATIONS

Great Britain search report dated Nov. 2, 2017 in priority Great Britain application GB1708460.9.
International Search Report dated Jun. 5, 2018 in parent PCT application PCT/2018/060987.

* cited by examiner

EMERGENCY LIGHTING CONVERTER

CROSS REFERENCE TO RELATED APPLICATIONS

The present application is the U.S. national stage application of international application PCT/EP2018/060987 filed Apr. 27, 2018, which international application was published on Nov. 29, 2018 as International Publication WO 2018/215171 A1. The international application claims priority to Great Britain Patent Application 1708460.9 filed May 22, 2017.

FIELD OF THE INVENTION

The invention relates to the field of switched mode power supplies, in particular to converters adapted to operate from energy storages and used in lighting applications such as emergency converters. In particular, the invention proposes a fast closed loop system in a converter using a microcontroller.

BACKGROUND OF THE INVENTION

Emergency lighting for a building relies on battery backed lighting devices that switch on automatically in an emergency mode of operation, when a power outage is detected. An emergency lighting system includes an energy storage device such as a battery, in particular a rechargeable battery for storing electric energy, a battery charger for maintaining the energy storage device at a predetermined charging level. A microcontroller is typically used to control the battery charger. An emergency lighting system further uses a lamp driver, for example an LED driver, a ballast or a converter for driving lighting means from the energy storage device for a predetermined time with a predetermined current in case of a power outage. Such emergency converter usually includes a switched mode power supply (SMPS) operating from a DC voltage supplied by the energy storage device and generates a required DC output voltage for driving for example LEDs of the emergency light. The emergency converter may be implemented for example in form of a boost converter or a similar circuit topology and includes an energy storage element and also a controlled switch. The emergency converter also requires a driver integrated circuit (LED driver IC) for controlling the emergency converter, in particular its switch in case of an emergency mode of operation. Due to the high switching frequencies employed in contemporary SMPs, the requirements with respect to timing are high, exceed the capabilities of cost effective microprocessors and usually met by dedicated application specified circuits employed as LED driver ICs for controlling the LED driver.

SUMMARY OF THE INVENTION

The invention addresses the problem of providing a cost effective converter for emergency lighting applications.

A converter device, in particular LED emergency converter device for operating from an energy storage device, comprises a driver circuit operating in a boundary conduction mode, and is characterized in that the driver circuit is implemented in a coupled inductor boost circuit topology including at least one switch.

Furthermore, using the coupled inductor boost topology for the driving circuit enables to drive lighting means such as LEDs of an LED module as load to the converter with a high voltage rating at a low duty cycle contrary to using the conventional boost converter topology. The switching frequencies of the coupled inductor boost converter are accordingly higher when compared to the conventional boost converter topology. This results in a conductor ("boost choke") of lower dimensions and smaller associated circuit elements which provides further advantages in space and cost.

Further embodiments of the electronic energy storage device are claimed in the dependent claims.

The converter device of an embodiment further comprises a charger circuit configured to charge the energy storage device and a microcontroller circuit configured to control the charger circuit. The microcontroller circuit is further configured to control the switch based on a zero crossing of a measured inductor current.

Implementing the light driver circuit in a coupled inductor boost topology and operating the coupled inductor boost converter in the boundary conduction mode enables to use electric components such as microcontroller circuit instead of a dedicated light driver circuit IC for controlling the driver circuit. This becomes possible as such event as a zero crossing of a current through the switch, or a polarity inversion of the switch current can be provided to the microcontroller circuit for triggering switch control such as opening and/or closing the switch by a microcontroller generated switch drive signal.

A preferred converter device has the driver circuit with a shunt resistor between the switch and a ground potential of the energy storage device. The battery discharge current is measured by monitoring a voltage over the shunt resistor and the inductor current is measured by monitoring a voltage over the switch.

Using the coupled inductor boost topology enables to acquire and to provide to the microcontroller circuit information on measured values based on which trigger events for implementing a control for driving the light driver circuit in a boundary conduction mode can be generated.

The converter device according to a further embodiment comprises a comparator configured to determine if the measured inductor current reaches zero, in particular when a sign of the detected inductor current reverses.

A further advantageous converter device comprises an analogue comparator configured to determine if the detected inductor current reaches zero by comparing the detected inductor current with a reference signal.

Using an analogue comparator available in microcontroller circuits in combination with using information on a polarity reversion of the inductor current acquired by sensing a current over the switch, enables to implement a fast and efficient control algorithm suitable for implementation on a microcontroller circuit on one hand and capable to control the drive circuit at high switching frequencies on the other hand.

A further embodiment of the converter device has the microcontroller circuit configured to control the inductor current on a cycle per cycle basis.

Another embodiment of the converter device has the microcontroller circuit configured to control the light drive circuit adapted to drive LED loads with defined output voltage ranges ranging from 10V to 50V or 50 V to 200 V.

BRIEF DESCRIPTION OF THE DRAWINGS

The description of an embodiment of the invention refers to the enclosed drawings in which FIG. 1 provides a general overview of major elements of a converter device according to an embodiment.

DETAILED DESCRIPTION

In the figures, same numerals denote the same or corresponding elements. For sake of conciseness, the description of the figures omits repeating the description of same reference signs for different figures.

Figure 1:
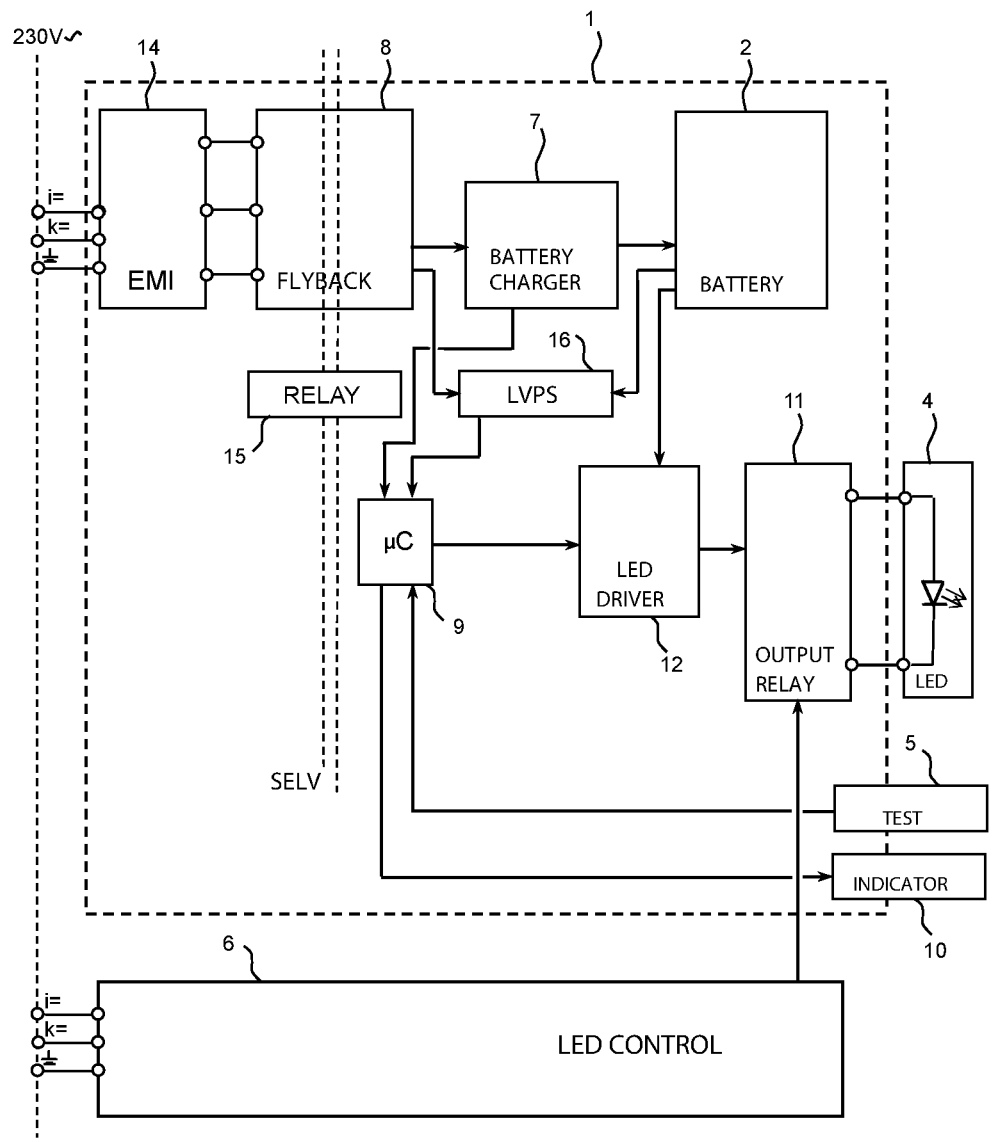
Figure 2:
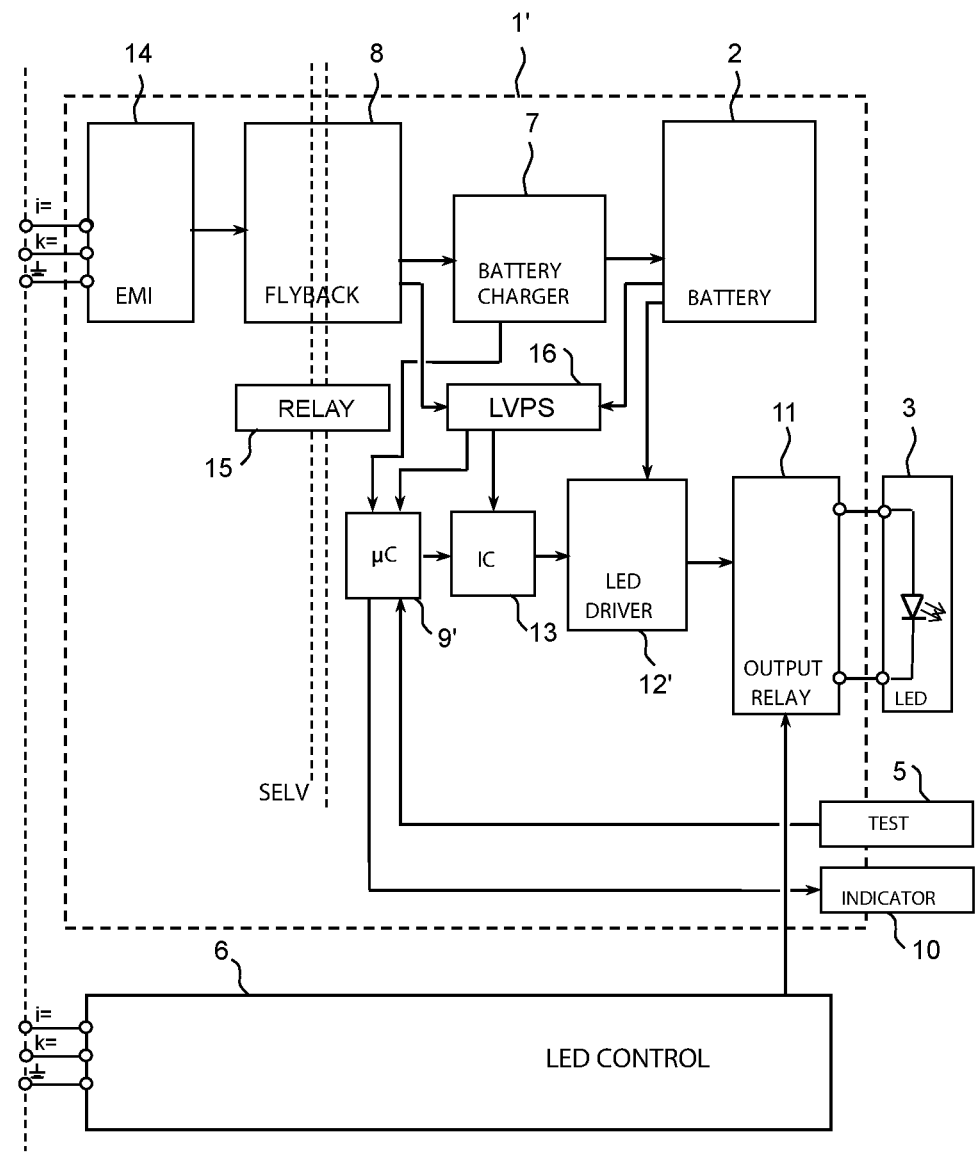
FIG. 2 is a general overview of major elements of a converter device according to prior art, FIG. 3 provides an overview of major elements of a microcontroller circuit replacing a dedicated controller IC for controlling a coupled inductor boost converter, FIG. 4 provides a simplified schematic circuit diagram of a preferred embodiment with a converter device in coupled inductor boost topology controlled by a microcontroller circuit, FIGS. 5A, B, C shows typical circuit waveforms of a coupled inductor boost converter.

Before presenting an embodiment of the invention based on FIG. 1, a general overview of major elements of a known emergency converter device for driving an emergency light from an energy storage device, for example a battery and in particular a rechargeable battery, is provided based on FIG. 2.

A usual way to provide emergency lighting uses battery backed emergency converter devices 1' that are installed within or adjacent to existing lighting fixtures. Upon sensing mains supply failure, the emergency converter device 1' switches into an emergency mode turning the existing lighting into emergency lighting in order to meet the requirements of an emergency lighting without the need of wiring separate emergency lighting circuits or additional wall mounts.

The depicted known emergency lighting converter device 1' includes mains supply input terminals for interfacing mains supply, in particular neutral line N, switched line L and ground line.

The emergency lighting converter 1' is a battery backed lighting device that switches automatically when the main light becomes unavailable due to a mains power outage. The main functionalities of the shown emergency lighting converter device 1' are to charge a battery 2 and to monitor mains supply. If the emergency lighting converter device 1' detects a mains supply failure, in particular if the mains supply voltage falls below a predefined threshold value, the emergency lighting device 1' drives a light emitting load, for example an emergency light 3 such as a LED module 3 including one or more LEDs, for a predetermined time with a predefined load current.

The emergency light converter 1' usually has an integrated test switch or alternatively or additionally an interface for a test switch 5 (test button) which is adapted to temporally override a standard lighting converter 6 and cause the emergency lighting converter 1' to drive the LED module 3 from battery power even if the mains power supply is available.

The known emergency lighting converter 1' includes a battery charger 7 for charging the energy storage device 2 from a DC voltage and current provided by the flyback converter 8. The battery charger circuit 7 is controlled by a microcontroller circuit 9. The microcontroller circuit 9 also includes an electric interface for the test switch 5 and an indicator LED 10.

The emergency light converter 1' also includes an output relay 11. The output relay 11 alternately switches a first relay input which is connected to an LED driver 12 (emergency LED driver 12) or a second relay input connected to the standard LED converter 6 to a relay output connected to the LED module 3. In case a mains supply failure is determined, the LED driver 12 provides a predefined LED drive current via the output relay 10 to the LED module 3. In case the mains supply is determined to be working correctly, the standard LED converter 6 provides the LED current for driving the LED module 3 via the output relay 11 to the LED module 3.

The LED driver 12' is a switched mode power supply, which receives a DC voltage input from the energy storage device 2 and provides the emergency LED load current to the output relay 11. The LED driver 12' is implemented in one of generally known boost converter topologies. A boost converter, also termed step-up converter, is a DC-to DC power converter that steps up a voltage from its input (battery) to its output (load). The input voltage range from the energy storage device 2 is typically 3V to 8.2V. The output voltage range of the LED driver 12 is typically from 10V to 200V. A boost converter is a switched mode power supply, which contains at least one diode and a controlled switch, in particular a bipolar transistor such as a MOSFET, a IGBT working as a switch, and a at least one energy storage element, preferably an inductor and/or a capacitor. Further capacitors are often arranged at the input or at the output of the coupled inductor boost converter, for example in order to suppress or at least reduce voltage ripple.

The switch of the LED driver circuit 12' is controlled via an LED driver integrated circuit (IC) 13. The LED driver IC 13 regulates the energy storage discharge current drawn from the energy storage device 2, controls the LED driver circuit 12 to step up an input voltage applied from the energy storage device 2 to the LED driver circuit 12' to a higher voltage provided to the LED module 3 by a large factor, operates the switch of the LED driver circuit 12 at a high switching frequency and controls the LED driver circuit 12 at a high duty cycle.

An EMI circuit 14 is arranged at the mains supply input of the emergency converter device 1' in order to filter the mains supply voltage input to the flyback converter 8. The flyback converter 8 can be adapted to provide galvanic isolation in order to separate a high voltage side of the emergency light converter device 1' from a low voltage side creating a SELV barrier. Control and monitoring signals are guided across the SELV barrier using suitable elements such as a relay 15 or an optocoupler not shown.

Typically on the low voltage side of the SELV barrier, the emergency lighting device arranges a low voltage power supply (LVPS) 16. The LVPS 16 generates low supply voltages and provides the generated low power supply voltages to the microcontroller circuit 9 and the LED driver IC 13 and other elements of the emergency converter device 1'. The input to the LVPS 16 is from the energy storage device 2 in an emergency mode of operation, or from the fly back converter 8 in a standard mode of operation at times of a working mains power supply.

FIG. 1 provides a general overview of major elements of the emergency lighting converter device 1 according to an embodiment of the invention.

In FIG. 1 the same numerals apply as in FIG. 2 depicting an emergency lighting converter according to prior art. The emergency lighting device 1 differs from FIG. 2 by including a LED driver circuit 12 in a coupled inductor boost configuration. The circuit topology of the coupled inductor boost converter 12 will be described in detail with respect to FIG. 4 below. The emergency lighting converter device 1 differs further from prior art by including a microcontroller 9 instead of the microcontroller 9' of the prior art. The combination of the LED driver circuit 12 in coupled inductor boost configuration with the microcontroller 9 accordingly omits the dedicated LED driver IC 11. This particular combination of LED driver circuit 12 in coupled inductor boost configuration with the microcontroller 22 which integrates the LED driver control function with the battery charger control function accordingly minimizes cost and reduces space requirements due to omitting the LED driver IC 11 by redistributing its functionalities.

Employing the coupled inductor boost topology for the LED driver circuit 12 enables to regulate the battery discharge current based on sensed signals using at least one low cost shunt resistor 30 which is at one side referenced to energy storage device ground potential.

Furthermore, the LED driver circuit 12 in coupled inductor boost topology is capable to step-up the input battery voltage by a large factor, to operate at a high switching frequency and high duty cycle, in particular when compared to standard boost converter topology.

The high switching frequency operation of the LED driver circuit 12 results in a simple winding structure of the inductor (boost choke) of the boost converter circuit. The simple winding structure goes along with reduced size of the inductor. Usually the inductor is one of the cost increasing circuit elements, which also requires a significant proportion of the space of a boost converter circuit.

The cost of the entire emergency converter device 1 are reduced when compared to known approaches, as the dedicated LED driver IC 13 is not required and the microcontroller circuit 12 according to the invention is additionally used to implement switch control for the LED driver circuit 12.

Even a single shunt resistor 30 can be used in order to sense a peak current over the switch on one hand and the average battery discharge current on the other hand.

According to the inventive solution, low voltage stress onto the switch of the LED driver circuit 12 enables to select a transistor switch with low $R_{ds}$ (on) when being switched on and the drain-source junction of the transistor switch is in a conducting state. A switch rated for lower voltages can be selected and cost is accordingly further reduced for the inventive approach.

The number of circuit components of microcontroller circuit 9 with LED driver circuit 12 is reduced when compared to microcontroller circuit 9', LED drive IC 13 and LED driver circuit 12', in particular due to eliminating the dedicated driver IC 13.

Moreover, the capability of operating the switch at a zero current value results in a high efficiency equal or higher than 80%. The coupled inductor boost converter preferably operates in the boundary conduction mode (critical conduction mode).

Figure 3:
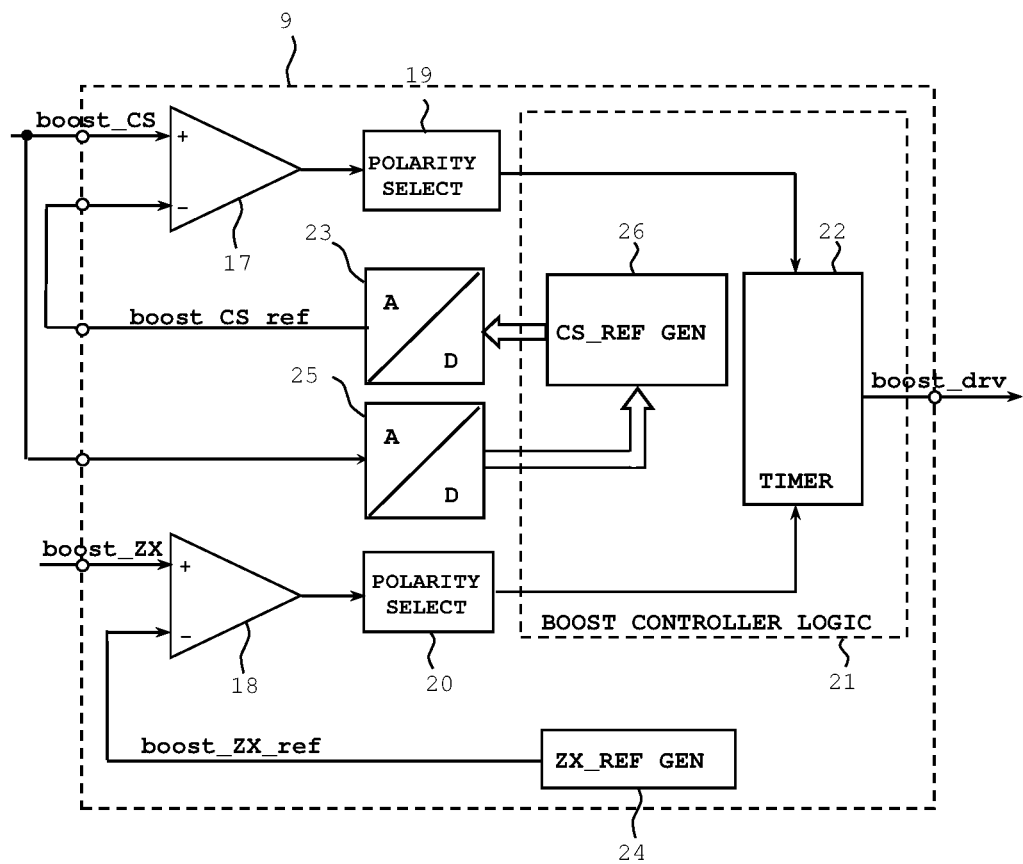

FIG. 3 shows major elements of a microcontroller circuit 9 used for replacing the dedicated LED driver IC 13 for controlling the coupled inductor boost converter used as LED driver circuit 12. The microcontroller circuit 9 includes analogue comparators 17, 18, one of which is used for sensing the inductor current and one for detecting a zero crossing of the inductor current.

The output signal of each comparator 17, 18 is fed internally via a polarity selection circuit 19, 20 of the microcontroller circuit 9 to a boost controller logic 21, preferably including a timer 22. The boost controller logic 21 of the microcontroller circuit 9 generates a boost driver signal boost_drv for controlling the switch of the LED driver circuit 12. The microcontroller circuit 9 further generates first and second reference signals. The first reference signal is an analogue current reference signal boost_CS_ref, which is generated by the boost controller logic 21 as a digital signal, provided to a digital-analogue converter (DAC) 23 of the microcontroller circuit 22 for conversion into the analogue current reference signal boost CS_ref, which is subsequently provided to a second inverting input of the first comparator circuit 17.

The microcontroller circuit 9 preferably acquires the analogue signal boost_CS from the LED driver circuit 12, converts the the analogue signal boost_CS in analog-to-digital converter (ADC) 25 into an digital signal boost_CS and provides the digital signal boost_CS to a CS reference generator 26 of the microcontroller circuit 9 and its boost controller logic 21. The CS reference generator 26 uses the digital boost_CS to generate the digital current reference signal boost_CS_ref.

The first non-inverting input of the first comparator 17 is provided with the analogue signal boost_CS from the LED driver circuit 12.

A zero-crossing reference signal boost_ZX_ref is generated by the microcontroller circuit 9, in particular its ZX reference generator 24 and fed to a second inverting input of the second comparator 18. The first non-inverting input of the second comparator 18 receives the analogue signal boost_ZX provided from the LED driver circuit 12.

Using the microcontroller circuit 9 as shown, and in particular the first comparator 17 for comparison of the inductor current, and the second comparator 18 for determining the point in time of the zero-crossing of the inductor current, is independent from any software, but uses analogue resources of the microcontroller circuit 9. Hence, the inventive approach provides advantageously fast reaction time not available by digital microcontroller circuits and software-based solutions, similar only to using a dedicated application-specific integrated circuits (ASIC).

Figure 6:
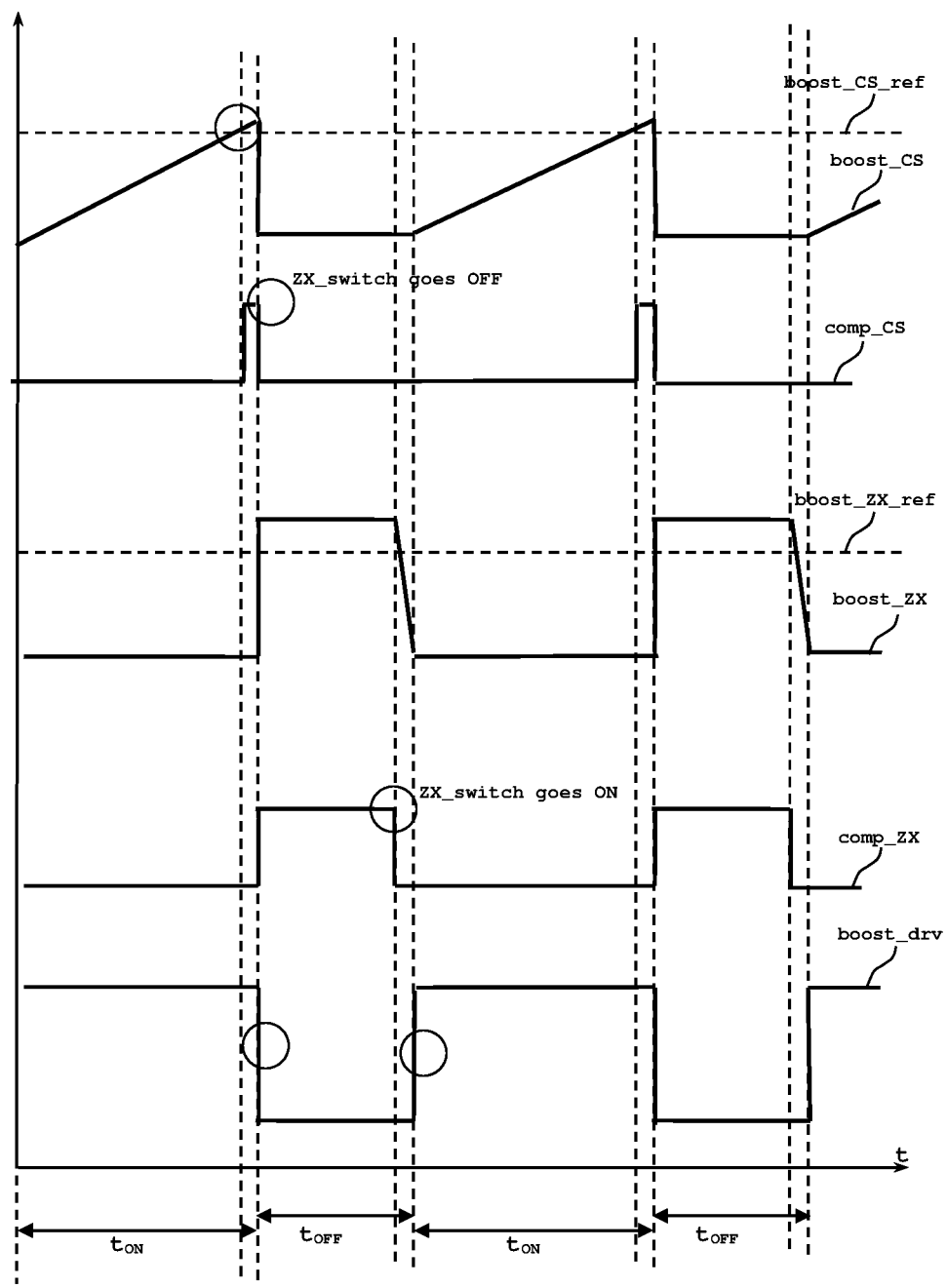
FIG. 6 depicts signal waveforms for controlling the coupled inductor boost converter by a microcontroller circuit according to the invention.

In order to generate the switch control signal boost_drv for controlling the switch, for example a gate drive signal of a transistor 27 for generating a pulse width modulation, the microcontroller circuit 9 uses an internal timer 22. Preferably, the timer 22 is running free with a defined duty cycle. FIG. 6 shows how the duty cycle of a LED drive signal provided by the LED driver circuit 12 is controlled according to the invention.

The inventive approach detects each cycle, cycle per cycle, an inductor current $I_{pk}$ and a zero crossing of the inductor current using the microcontroller circuit 9. Adding a closed loop using the zero crossing detection to trigger a second cycle as the microcontroller circuit 9 does, provides advantageously fast reaction time not available by digital microcontroller 9' according to prior art.

Figure 4:
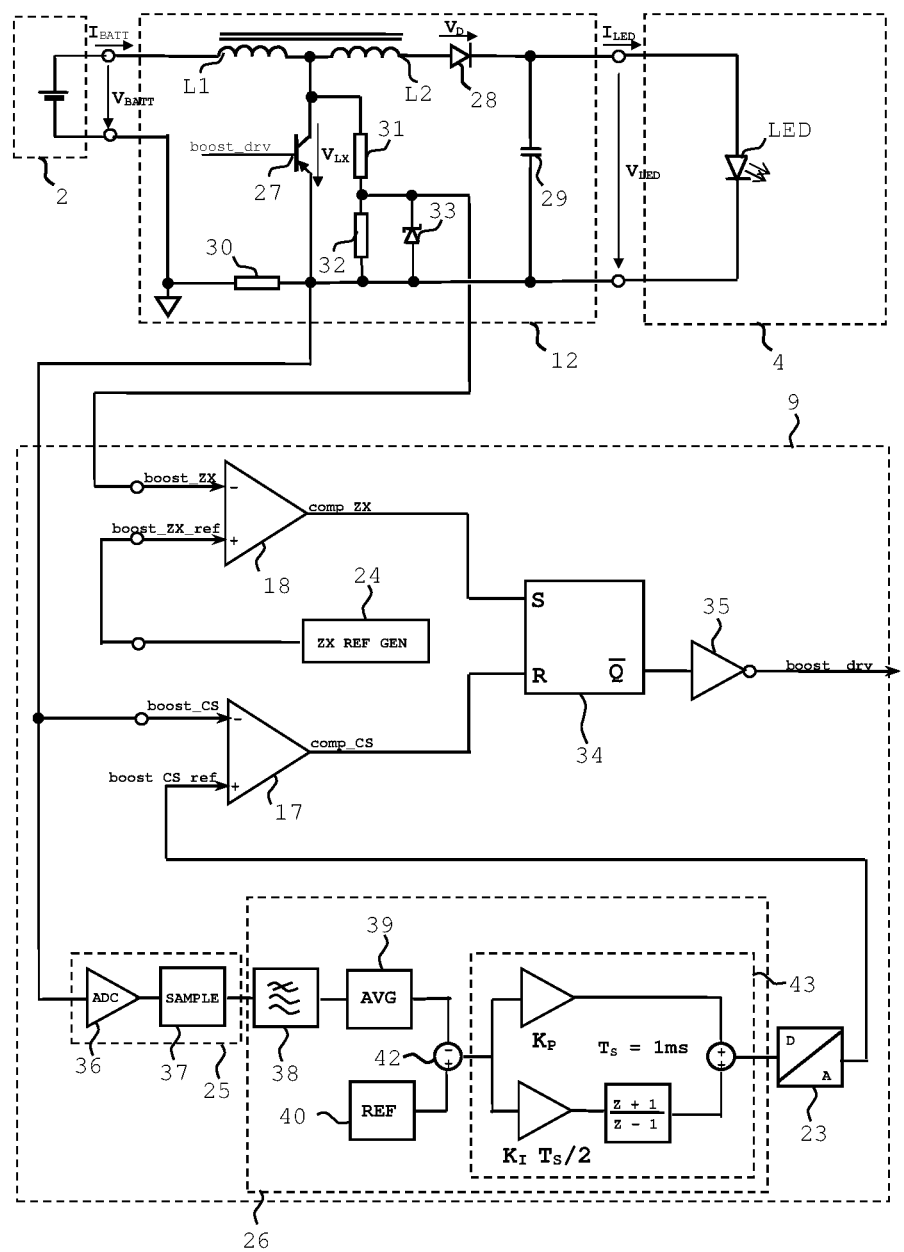

FIG. 4 shows a simplified schematic circuit diagram of a preferred embodiment of the emergency converter device 1 with an LED driver circuit 12 in coupled inductor boost topology controlled by a microcontroller circuit 9.

The coupled inductor boost converter circuit 21 includes two inductors L1 and L2 connected in series. A switch (boost switch) 27 is connected from the ends of the inductors L1, L2 where inductors L1, L2 are connected to ground of the LED driver circuit 12. The main circuit components of the coupled inductor boost circuit topology are complemented by a diode 28. The circuit topology shown in FIG. 4 is simplified, further electric elements may be added, for example a capacitor 29 at the output of the LED driver circuit 12. The LED driver circuit 12 depicted includes a single channel for driving a LED exclusively when a mains supply failure is detected. More than one LED drive channel may be implemented or the LED may be driven via an output relay 10.

The input voltage $V_{BATT}$ supplied by battery 2 as energy storage device is typically in a range from 3 V to 8.2 V.

The output voltage range $V_{LED}$ provided to the LED module 4 is typically in a range 10 V to 200 V. The LED module may include one or more light emitting diodes LEDs.

The LED driver circuit 12 comprises a shunt resistor $R_{shunt}$ 30 for sensing an average battery discharge current $I_{BATT}$ and a peak boost switch current. This information contained in the signal boost_CS is supplied to the microcontroller circuit 9.

The LED drive circuit 12 further detects a zero current over the switch 27 by monitoring a voltage $V_{LX}$ over the switch 27 using the voltage divider formed by resistors 31 and 32. The Z-diode (Zener-diode) 33 serves to clamp a negative electric potential at the input pin of the microcontroller circuit 9 and is connected to the second comparator 18 of the microcontroller circuit 22. The voltage $V_{LX}$ over the switch 27 is provided as information in the signal boost_ZX to the first input of the second comparator 18.

In particular, the microcontroller circuit 9 senses on cycle-per-cycle basis, the signals boost_CS and boost_ZX in order to generate the driver control signal boost_drv, preferably as a gate control signal to a transistor functioning as switch 27, on the basis of the sensed signals boost_CS and boost_ZX. An embodiment logic how to generate the driver control signal boost_drv is presented with reference to FIG. 3 above. FIG. 4 shows a functional equivalent circuit topology using first comparator 17, second comparator 18, a latch 34 and an inverting amplifier 35 to generate the switch drive signal boost_drv from the input signals boost_CS and boost_ZX.

The lower portion of FIG. 4 depicts an exemplary circuitry for generating the reference signal boost_CS_ref in the CS reference generator 26. The signal boost_CS is provided to an AD converter 25, represented in FIG. 4 by an amplifier 36 amplifying the signal boost_CS by the AD converter gain and subsequently sampling the signal in the sample stage 37 to convert the signal boost_CS from a time-continuous signal into a time-discrete signal. The time-discrete signal is then supplied to a low-pass filter 38 and averaged in an averaging stage 39. The filtered and averaged time-discrete signal is subsequently compared to a reference signal to determine an error signal, the reference signal generated by a reference generator 40. The reference generator 40 generates the reference signal representing a reference battery discharge current.

In the shown embodiment of the CS reference generator 26, a subtractor 42 generates a battery discharge current error signal by subtracting the averaged time-discrete signal boost_CS from the reference battery discharge current.

The battery discharge current error signal provides an input signal to a subsequent Proportional-Integral Controller (PI-Controller) 43. By passing the battery discharge current error signal through he PI-controller 43, a steady time-discrete DC signal is generated. The steady time-discrete DC signal is converted to an analogue signal by the digital analogue-converter (D/A) converter 23 and provided as an analogue signal boost_CS_ref to the second input of the first comparator 17. The first comparator 17 uses the analogue signal boost_CS_ref as a peak current reference, in order to provide control to the switch 27 on a cycle-per-cycle basis. In this peak current mode control, the switch 27 is turned off by the switch drive signal boost_drv when a peak current over the switch 27 reaches the reference peak current generated by the CS reference generator 26.

The ZX_reference generator 24 generates the signal boost_ZX_ref and provides the signal boost_ZX_ref to the second input of the second comparator 18. Preferably, the signal boost_ZX_ref is a threshold voltage for detecting the zero crossing of the current over the switch 27 via the voltage divider including resistors 31, 32. Exemplarily the threshold voltage has a value of about 1.25 V. Given this case, a zero current condition is detected when the voltage $V_{LX}$ between drain and source electrode of the switch 27 falls below 1.25 V. When the voltage $V_{LX}$ across the switch 27 falls below 1.25 V, the switch drive signal boost_drv applied to the gate electrode of the transistor switch 27 is set to turn the switch 27 on again.

By switching the switch 27 into its conducting state when the output current $I_{LED}$ corresponding to a current through the second inductor L2 reaches zero enables to operate the LED driver circuit 12 in the boundary conduction mode of a boost converter, in particular coupled inductor boost converter.

Figure 5:
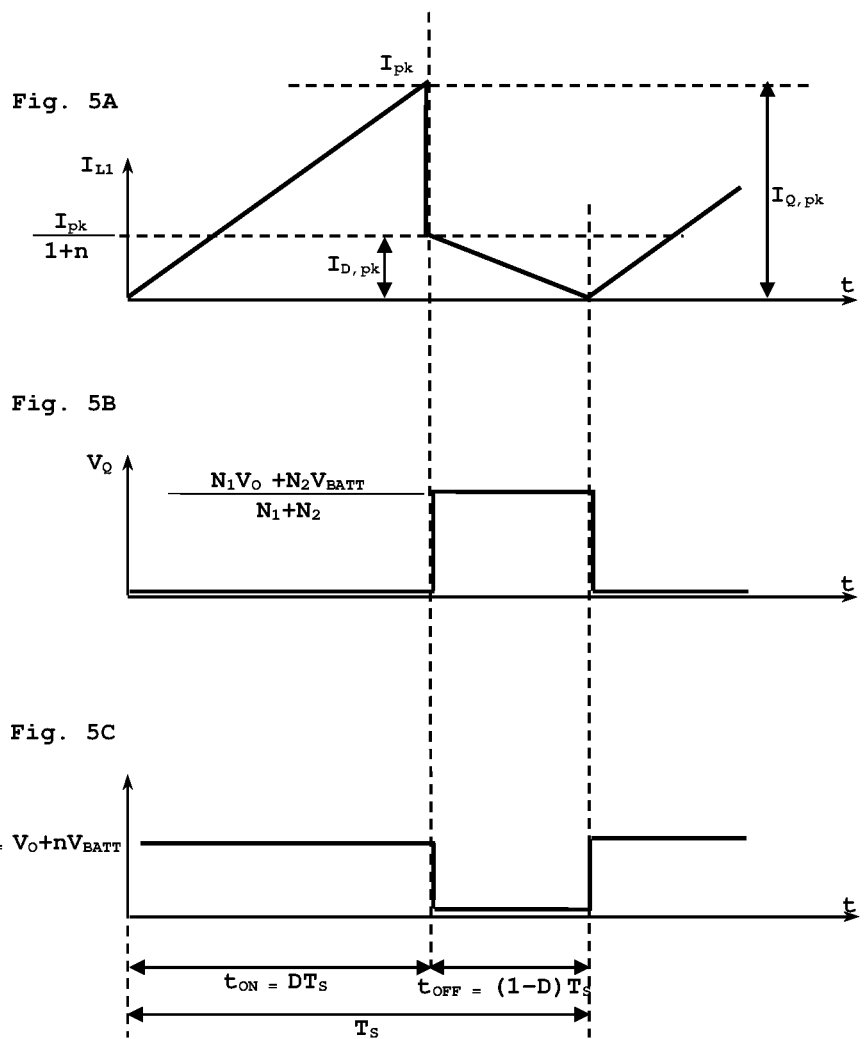

FIG. 5 shows typical circuit waveforms of a coupled inductor boost converter over one cycle of the coupled inductor boost converter. In FIG. 5A an inductor current over the inductor L1 of the coupled inductors L1 and L2 is depicted. $I_{pk}$ is a peak current over the inductor L1. $I_{D,pk}$ is a peak current over the diode 28 when the switch 27 is open (not-conducting) during the time interval $$t_{off}=(1-D)T_s; \quad (1)$$

D is the duty cycle of the switch 27, n is the relation of an inductor winding $N_1$ of inductor L1 to a number $N_2$ of inductor windings of inductor L2, $T_s$ is a switch period of the switch 27 with $$T_s=t_{ON}+t_{OFF}; \quad (2)$$

In FIG. 5B, a voltage $V_{LX}$ over the switch 27 is shown for one cycle or period $T_s$ of the switch 27 and the LED driver circuit 27.

$$V_{LX}=(N_1V_{LED}+N_2V_{BATT})/(N_1+N_2); \quad (3)$$

In (3), $V_{LX}$ denotes the voltage across the switch 27, $N_1$ the number of windings of the first inductor L1 and $N_2$ the number of windings of the second inductor L2. $V_{BATT}$ is the voltage, which the battery 2 provides.

In FIG. 5C voltage $V_D$ over the diode 28 is depicted over one cycle. The voltage $V_D$ during the time $t_{ON}$ corresponds to $$V_D=V_{LED}+n*V_{BATT}; \quad (4)$$

and is zero when the switch is on (non conducting) during the time duration $t_{On}$.

In FIG. 6 the method for generating the switch drive signal boost_drv based on the cycle per cycle current sense signal boost_CS and zero crossing signal boost_CS signal is shown. More specifically, FIG. 6 depicts signal waveforms for controlling the LED driver circuit 12 (coupled inductor boost converter) by a microcontroller circuit 9 according to the invention over two cycles of the switch period $T_s$.

In FIG. 6, an output signal of the first comparator 17 is the signal comp_CS, an output signal of the second comparator 18 is the signal comp_ZX.

The signal boost_drv corresponds to a signal which is applied to the gate-drain junction of the transistor functioning a switch 27. When the switch 27 is closed during time duration $t_{on}$ of the first cycle, a current over the inductor L1 increases. The corresponding signal boost_CS raises correspondingly and finally exceeds a threshold defined by the reference signal boost_CS_ref.

The DC error signal output from the PI-controller 43 is converted into an analogue reference signal boost_CS_reference and provided to the second input of the first comparator 17 as being used as a peak current reference to control the boost switch 27 in peak current mode control on a cycle per cycle basis. Thus, the switch 27 is opened based on the switch driver signal boost_drv, when the peak current over the switch 27 reaches the reference peak current generated by the PI-controller 43 as shown in FIGS. 4 and 6.

The LED driver circuit 12 is operated in a boundary conduction mode. Hence, the switch is turned on again when a current through the inductor L2 reaches zero. The current through the inductor L2 corresponds to the output current $I_{LED}$ to the LED module 4.

The time when the switch 27 is turned on again is determined using the voltage $V_{LX}$ over the switch 27. Preferably, the voltage $V_{LX}$ is measured by using the resistor divider network formed by resistors 31 and 32 in FIG. 4. The voltage $V_{LX}$ reaches zero, when the current through the inductor L2 reaches zero. The signal boost_ZX corresponding to the measured value of the voltage $V_{LX}$ is provided to the first input of the second comparator 18. The second input of the second comparator 18 is provided with the reference voltage boost_ZX_ref. If the value of the signal boost_ZX drops below the value boost_ZX_ref, a zero crossing of the current $I_{LED}$ is determined and the switch 27 is switched on again.

In this manner the switch 27 is switched on when the measured voltage across the switch $V_{LX}$ reaches zero. The point in time at which the switch 27 is turned off is when the peak current through the switch 27 reaches the reference peak current generated in the microcontroller circuit 9. The resulting switch drive signal boost_drv is shown as the signal at the bottom of FIG. 6. By the control method implemented in the microcontroller circuit 9, the detection of the zero crossing of the current through the switch 27 is accordingly used to trigger a next cycle of the coupled inductor boost converter used in the LED drive circuit 12. The entire control of the LED drive circuit 12 is exclusively performed using assets of the microcontroller circuit 9. In particular the analogue comparators 17, 18 guarantee a fast signal processing particularly suitable to provide for high switching frequencies of the switch 27. Accordingly, an LED control IC 13 for controlling a switched mode power supply such as LED drive circuit 12' of prior art solutions can be dispensed with when following the inventive approach.

Figure 7:
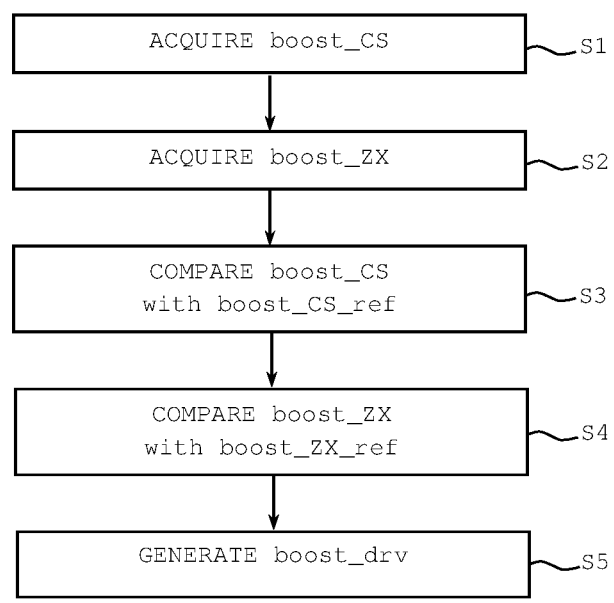
FIG. 7 shows a flowchart of a method performing the control of an emergency converter according to an embodiment.

FIG. 7 shows a basic flowchart of a method performing the control of an emergency converter device 1 according to an embodiment. In particular, the method comprises the microcontroller circuit 12 controlling the switch 27 in a mode in which the driver circuit 12 is operated from the energy storage device 2.

The method comprises a first step S1 of the microcontroller circuit 12 obtaining a first signal including information on a discharge current of the energy storage device 2 from the light driver circuit 12.

The method proceeds with a step S2 of the microcontroller circuit 9 obtaining a second signal including information if a current through an inductor L2 of the driver circuit 12 reaches zero.

The method proceeds to step S3 of comparing the first signal including information on the discharge current with a discharge current reference signal.

The method further compares in step S4 the acquired second signal including information if a current through an inductor L2 of the driver circuit 21 reaches zero.

In step S5, the method generates the a switch drive signal boost_drv in order to maintain a predetermined discharge current from the energy storage device 2 and to provide the generated switch drive signal boost_drv to the switch 27 of the lighting drive circuit 12.

The invention claimed is:

1. An LED emergency converter device for operating from an energy storage device, comprising:
   a light driver circuit operating in a boundary conduction mode, wherein the light driver circuit is implemented in a coupled inductor boost circuit topology including and comprises at least one switch and a shunt resistor between the switch and a ground potential of the energy storage device (2), wherein the light driver circuit outputs a first analog signal representing battery discharge current that is measured by sensing a voltage over the shunt resistor and a second analog signal representing inductor current that is measured by sensing a voltage over the switch;
   a microcontroller circuit configured to output a signal to control the switch of the light driver circuit, said microcontroller circuit also comprising a first analog comparator that compares the first analog signal to a reference peak signal and a second analog comparator that compares the second analog signal to a zero crossing reference signal, wherein the reference peak signal sets a threshold voltage over the shunt resistor and the zero crossing reference signal sets a threshold voltage over the switch when the measured inductor current reaches or crosses zero and when a polarity of the measured inductor current reverses;
   wherein the microcontroller circuit is configured to control the inductor current on a cycle by cycle basis and turns the switch to a non-conducting state when the first analog signal meets or exceeds the peak reference signal, and turns the switch to a conducting state when the second analog signal falls to or below the zero crossing reference signal.

2. The LED emergency converter device according to claim 1, further comprising a charger circuit configured to charge the energy storage device, wherein the and a microcontroller circuit is further configured to control the charger circuit.

3. The LED emergency converter device according to claim 1 wherein the microcontroller circuit further comprises a latch that receives a signal from the first analog comparator and a signal from the second analog comparator, and outputs a signal which is used, or is modified and used, to control the state of the switch in the light driver.

4. The LED emergency converter device according to claim 1 wherein the microcontroller circuit includes a zero crossing reference generator that generates the zero crossing reference signal.

5. The LED emergency converter device according to claim 1 wherein the microcontroller circuit has an analog to digital converter to convert the first analog signal to a digital signal, a digital processor that generates a time-discrete digital signal, and a digital to analog converter that output an analog reference peak signal that is supplied to the first analog comparator.

6. The LED emergency converter device according to claim 5 wherein the digital processor in the microcontroller circuit that generates a time-discrete digital signal comprises a low pass filter, a subtractor that generates a battery discharge error signal by subtracting an average of the time-discrete signal from a reference battery discharge current, and a proportional-integral controller.

7. The LED emergency converter device according to claim 1 wherein the switch comprises a transistor that is driven for generating pulse width modulation.

8. The LED emergency converter device according to claim 1 wherein the microcontroller circuit includes an internal timer that runs with a define duty cycle.

* * * * *